(12) United States Patent
Kang

(10) Patent No.: US 11,810,721 B2
(45) Date of Patent: Nov. 7, 2023

(54) MULTILAYER CERAMIC ELECTRONIC COMPONENT

(71) Applicant: SAMSUNG ELECTRO-MECHANICS CO., LTD., Suwon-si (KR)

(72) Inventor: Dongwoo Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 23 days.

(21) Appl. No.: 17/403,171

(22) Filed: Aug. 16, 2021

(65) Prior Publication Data

US 2022/0254571 A1    Aug. 11, 2022

(30) Foreign Application Priority Data

Feb. 5, 2021    (KR) .................. 10-2021-0016695

(51) Int. Cl.
*H01G 4/232* (2006.01)
*H01G 4/30* (2006.01)
*H01G 4/008* (2006.01)
*H01G 4/248* (2006.01)

(52) U.S. Cl.
CPC ......... *H01G 4/2325* (2013.01); *H01G 4/0085* (2013.01); *H01G 4/30* (2013.01); *H01G 4/248* (2013.01)

(58) Field of Classification Search
None
See application file for complete search history.

(56) References Cited

U.S. PATENT DOCUMENTS

| 9,633,792 | B2 * | 4/2017 | Lee .......................... C09D 5/24 |
| 2009/0139754 | A1 | 6/2009 | Ikarashi et al. |
| 2016/0020028 | A1 * | 1/2016 | Katsuta ................ H01G 4/2325 |
| | | | 361/301.4 |

(Continued)

FOREIGN PATENT DOCUMENTS

| JP | 3904798 B2 * | 4/2007 | ................ C09J 9/02 |
| JP | 4575617 B2 * | 11/2010 | |

(Continued)

*Primary Examiner* — Dion R. Ferguson
(74) *Attorney, Agent, or Firm* — Morgan, Lewis & Bockius LLP

(57) ABSTRACT

A multilayer ceramic electronic component includes a ceramic body including a dielectric layer and first and second internal electrodes alternately laminated with the dielectric layer interposed therebetween; a first external electrode connected to a first internal electrode; and a second external electrode connected to a second internal electrode, wherein the first external electrode includes a first base electrode layer disposed on the ceramic body and a first resin electrode layer disposed on the first base electrode layer, wherein the second external electrode includes a second base electrode layer disposed on the ceramic body and a second resin electrode layer disposed on the second base electrode layer, and wherein the first resin electrode layer and the second resin electrode layer include a shape memory polymer (e.g., a thermosetting shape memory polymer) or a polymer having properties including a property that exhibits shape memory effect.

18 Claims, 3 Drawing Sheets

A

(56) References Cited

U.S. PATENT DOCUMENTS

| | | | |
|---|---|---|---|
| 2016/0099110 A1* | 4/2016 | Lee | C09D 5/24 |
| | | | 252/514 |
| 2019/0272955 A1* | 9/2019 | Oh | H01G 4/2325 |
| 2020/0043628 A1 | 2/2020 | Du et al. | |
| 2020/0075257 A1* | 3/2020 | Kim | H01G 4/2325 |
| 2021/0090804 A1* | 3/2021 | Park | H01G 4/232 |
| 2021/0375545 A1* | 12/2021 | Zenzai | H01G 4/2325 |
| 2022/0254571 A1* | 8/2022 | Kang | H01G 4/2325 |

FOREIGN PATENT DOCUMENTS

| | | | | | |
|---|---|---|---|---|---|
| JP | 2016195082 A | * | 11/2016 | | |
| JP | 2018106906 A | * | 7/2018 | | |
| JP | 2020-023692 A | | 2/2020 | | |
| JP | 2021506129 A | * | 2/2021 | | |
| WO | WO2004053901 A1 | * | 4/2006 | | |
| WO | 2007/072894 A1 | | 6/2007 | | |
| WO | WO2006100909 A1 | * | 9/2008 | | |
| WO | WO-2015050252 A1 | * | 4/2015 | ............... | H01B 1/22 |

\* cited by examiner

MULTILAYER CERAMIC ELECTRONIC COMPONENT

CROSS-REFERENCE TO RELATED APPLICATION(S)

This application claims the benefit of priority to Korean Patent Application No. 10-2021-0016695 filed on Feb. 5, 2021 in the Korean Intellectual Property Office, the disclosure of which is incorporated herein by reference in its entirety.

TECHNICAL FIELD

The present disclosure relates to a multilayer ceramic electronic component.

BACKGROUND

Recently, as electronic products have been widely used, the technical field in which a multilayer ceramic electronic component is used has also expanded. In particular, according to the electronization of vehicles, a structure in which an electronic control unit (ECU) or a transmission control unit (TCU) of a vehicle is disposed in an engine bay or is directly attached to a transmission has been used.

However, when a general multilayer ceramic electronic component is applied in a harsh environment such as high temperature and high vibration, expansion and reduction for high/low temperature cycles may be repeated, such that continuous mechanical stress may occur. Also, continuous application of mechanical stress may be a major cause of cracks in terminal electrodes or solders.

To address the above issue, a method of absorbing external impacts or internal stress by applying a soft term such as an epoxy resin to an external electrode has been used. When such a soft term is applied, since a base resin has a modulus of elasticity higher than that of metal, cracks caused by mechanical stress may be alleviated.

However, as a multilayer ceramic electronic component has been designed to have a reduced size and high capacity, a thickness of the external electrode has been decreased. Also, even when a soft term is applied to an external electrode having a reduced thickness, it may be highly likely that mechanical deformation such as peeling of the soft term may occur through external impacts or vibrations. Further, a deformed soft term may become a potential cause of malfunction and a major cause of product quality degradation due to a decrease in mechanical strength.

SUMMARY

An aspect of the present disclosure is to provide a multilayer ceramic electronic component which may prevent defects such as lifting or delamination of an external electrode even under conditions of high temperature and/or high vibrations.

An aspect of the present disclosure is to provide a multilayer ceramic electronic component having improved long-term reliability.

According to an aspect of the present disclosure, a multilayer ceramic electronic component includes a ceramic body including a dielectric layer and first and second internal electrodes alternately laminated with the dielectric layer interposed therebetween; a first external electrode connected to a first internal electrode of the ceramic body; and a second external electrode connected to a second internal electrode, wherein the first external electrode includes a first base electrode layer disposed to be in contact with the ceramic body and a first resin electrode layer disposed on the first base electrode layer, wherein the second external electrode includes a second base electrode layer disposed to be in contact with the ceramic body and a second resin electrode layer disposed on the second base electrode layer, and wherein the first resin electrode layer and the second resin electrode layer include a thermosetting shape memory polymer.

According to an aspect of the present disclosure, a multilayer ceramic electronic component includes a ceramic body including first and second internal electrodes; a first external electrode connected to a first internal electrode of the ceramic body; and a second external electrode connected to a second internal electrode. The first external electrode includes a first base electrode layer disposed to be in contact with the ceramic body and a first resin electrode layer disposed on the first base electrode layer, and the second external electrode includes a second base electrode layer disposed to be in contact with the ceramic body and a second resin electrode layer disposed on the second base electrode layer. The first resin electrode layer and the second resin electrode layer include a polymer having properties including a property that exhibits shape memory effect.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
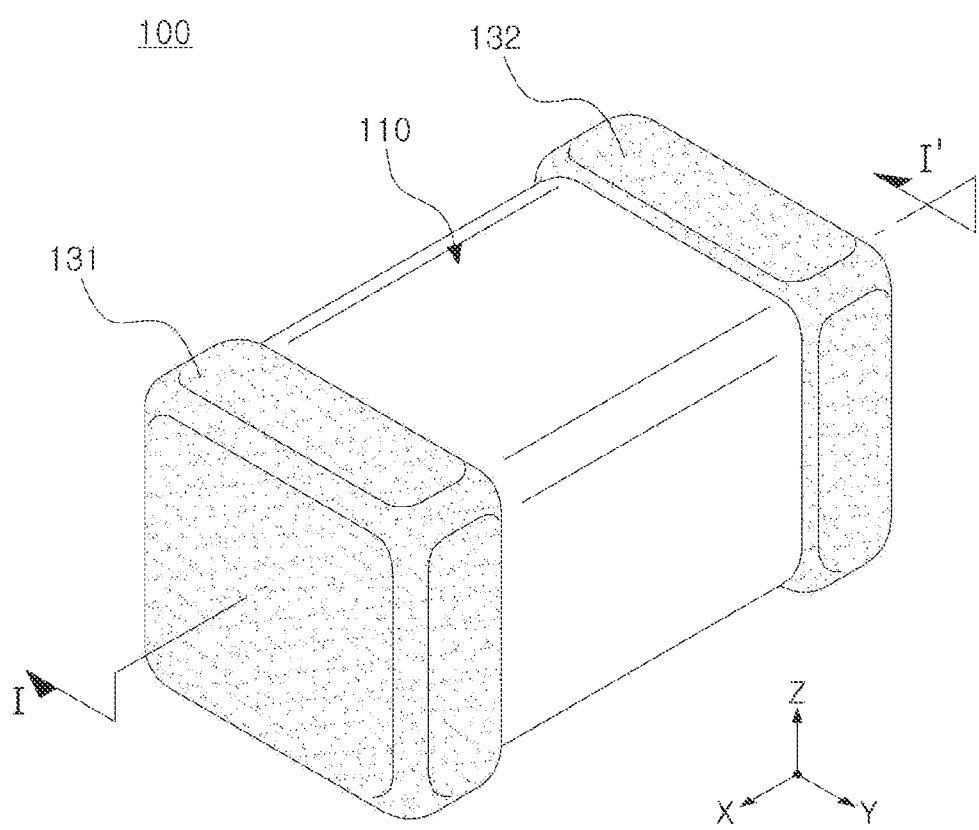
FIG. 1 is a perspective diagram illustrating a multilayer ceramic electronic component according to an example embodiment of the present disclosure.

Hereinafter, embodiments of the present disclosure will be described as follows with reference to the attached drawings.

It should be understood that the following exemplifying description of the invention is not intended to restrict the invention to specific forms in an example embodiment but rather the present disclosure is meant to cover all modifications, similarities and alternatives included in the spirit and scope in an example embodiment. The same elements will be indicated by the same reference numerals.

In the drawings, elements irrelevant to the description are omitted to clearly describe the present disclosure, and a thickness has been enlarged to clearly represent multiple layers and regions, and elements having the same function may be described with the same reference numerals.

For clarity of description, some elements may be omitted or briefly illustrated, and thicknesses of elements may be magnified to clearly represent layers and regions. The terms, "include," "comprise," "is configured to," etc. of the description are used to indicate the presence of features, numbers, steps, operations, elements, parts or combination thereof, and do not exclude the possibilities of combination or addition of one or more features, numbers, steps, operations, elements, parts or combination thereof.

In example embodiments, expressions such as "A and/or B," "at least one of A and/or B", or "one or more of A and/or B" may include all possible combinations of items listed together. For example, "A and/or B", "at least one of A and/or B," or "at least one of A and/or B" may include (1) at least one A, (2) at least one B, or (3) all of at least one A and at least one B.

In the diagram, an X direction may be defined as a first direction, an L direction, or a length direction, a Y direction may be defined as a second direction, a W direction, or a width direction, and a Z direction may be defined as a third direction, a T direction, or a thickness direction.

In this specification, that a member is disposed "on" a certain component includes not only the case where the member is disposed in direct contact with the component, but also the case where another component is disposed between the component and the member.

Figure 2:
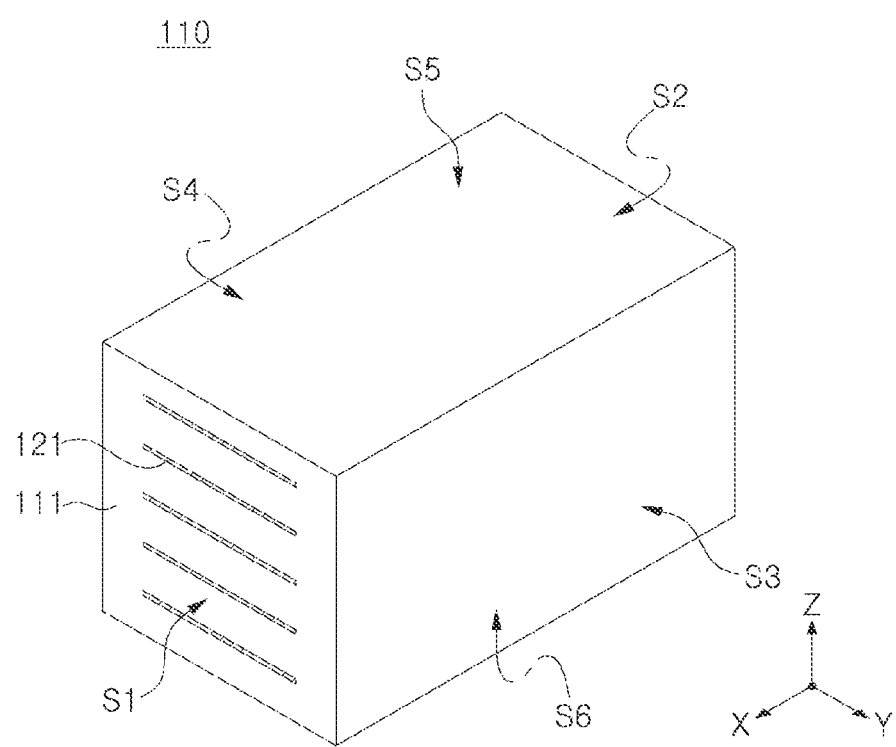
FIG. 2 is a perspective diagram illustrating a ceramic body illustrated in FIG. 1.
Figure 3:
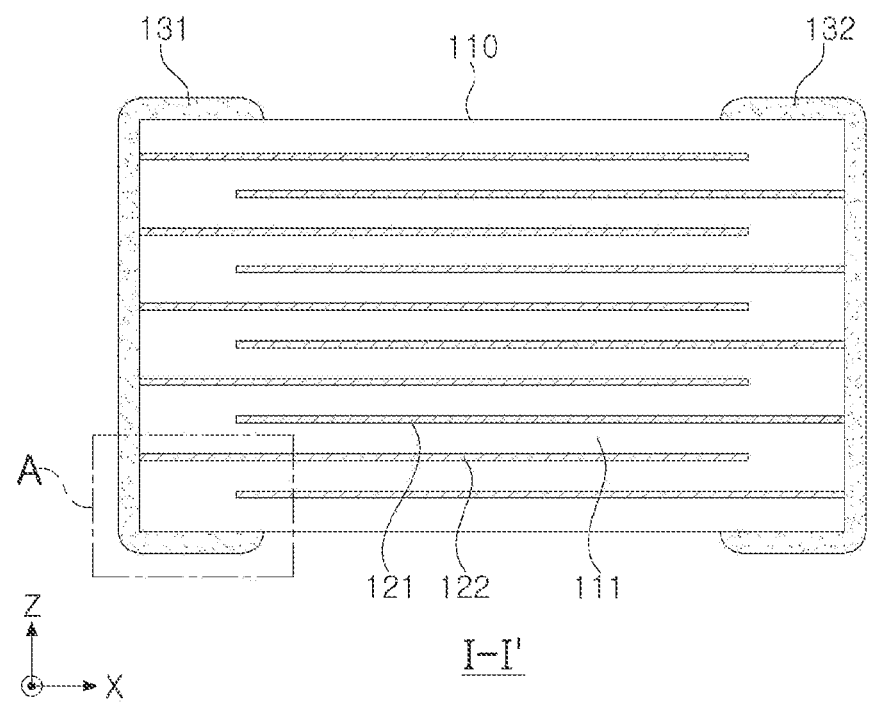
FIG. 3 is a cross-sectional diagram taken along line I-I' in FIG. 1.

Hereinafter, a multilayer ceramic electronic component according to an example embodiment will be described in detail with reference to FIGS. 1 to 3. Referring to FIGS. 1 to 3, a multilayer ceramic electronic component 100 according to an example embodiment may include a dielectric layer 111 and first and second internal electrodes 121 and 122 disposed to be alternately laminated with the dielectric layer 111 interposed therebetween, and may further include a ceramic body 110, a first external electrode 131 connected to the first internal electrode 121 of the ceramic body 110, and a second external electrode 132 connected to the second internal electrode 122 of the ceramic body 110.

The first external electrode 131 may include a first base electrode layer 131a disposed to be in contact with the ceramic body 110 and a first resin electrode layer 131b disposed on the first base electrode layer 131a. Also, the second external electrode 132 may include a second base electrode layer 132a disposed to be in contact with the ceramic body 110 and a second resin electrode layer 132b disposed on the second base electrode layer 132a. In this case, the first resin electrode layer 131b and the second resin electrode layer 132b may include a thermosetting shape memory polymer.

In example embodiments, the term "shape memory polymer (SMP)" may refer to a polymer exhibiting a shape memory effect (SME), and the term "shape memory effect" may refer to the phenomenon in which a shape memorized at a constant temperature may be memorized, and after a shape changes to a difference shape by applying force, when heat, magnetic field, electric field, light, or the like, are applied, the shape may return to the original shape. The shape memory polymer may have a three-dimensional network structure. The network structure may include physical and/or chemical crosslinks formed by a plurality of polymer chains. In the multilayer ceramic electronic component in an example embodiment, the first resin electrode layer 131b and the second resin electrode layer 132b include a thermosetting shape memory polymer, such that, even when deformation occurs by an external force, mechanical deformation may be addressed through self-healing.

In an example embodiment, the multilayer ceramic electronic component 100 may include the ceramic body 110 including the dielectric layer 111 and first and second internal electrodes 121 and 122 alternately laminated with the dielectric layer 111 interposed therebetween.

The ceramic body 110 may include first and second surfaces S1 and S2 opposing in the first direction (X direction), third and fourth surfaces S3 and S4 opposing each other in the second direction (Y direction), and fifth and sixth surfaces S5 and S6 opposing each other in the third direction (Z direction).

A shape of the body 110 may not be limited to any particular shape, but as illustrated in the diagram, the body 110 may have a hexahedral shape or a shape similar to a hexahedron. Due to reduction of a ceramic powder included in the body 110 during a baking process, the body 110 may have substantially a hexahedral shape although the hexahedral shape may not be an exact hexahedron formed by straight lines. Corners of the ceramic body 110 may be rounded to not be angular if desired. As the rounding treatment, barrel polishing may be used, but an example embodiment thereof is not limited thereto.

In the ceramic body 110, the dielectric layers 111, the first internal electrode 121, and the second internal electrode 122 may be alternately laminated. The dielectric layer 111, the first internal electrode 121, and the second internal electrode 122 may be laminated in the third direction (Z direction). The plurality of dielectric layers 111 may be in a baked state, and boundaries between the dielectric layers 111 adjacent to each other may be integrated such that it may be difficult to identify the boundaries without using a scanning electron microscope (SEM).

In an example embodiment, a raw material for forming the dielectric layer 111 is not particularly limited as long as sufficient electrostatic capacity may be obtained. For example, a barium titanate material, a lead composite perovskite material, a strontium titanate material, or the like, may be used, or a component expressed as $(Ba_{1-x}Ca_x)(Ti_{1-y}(Zr, Sn, Hf)_y)O_3$ ($0 \leq x \leq 1$, $0 \leq y \leq 0.5$) may be used. Also, as a material for forming the dielectric layer 111, various ceramic additives, organic solvents, plasticizers, binders, dispersants, or the like, may be added to powder such as barium titanate ($BaTiO_3$).

The dielectric layer 111 may be formed by adding an additive to a slurry including the above-described material if desired, applying and drying the slurry on a carrier film, thereby preparing a plurality of ceramic sheets. The ceramic sheet may be formed by forming the slurry in a form of a sheet having a thickness of several μm by a doctor blade method, but an example embodiment thereof is not limited thereto.

The first and second internal electrodes 121 and 122 may be laminated so that respective cross-sectional surfaces thereof may be drawn out to opposite ends of the ceramic body 110, respectively. Specifically, the first and second internal electrodes 121 and 122 may be drawn out to both surfaces of the ceramic body 110 in the first direction (X direction), respectively, and the first internal electrode 121 may be drawn out in a direction of the first surface S1 of the ceramic body 110, and the second internal electrode 122 may be drawn out in the direction of the second surface S2.

A material of the first and second internal electrodes 121 and 122 may not be limited to any particular material, and may be formed using a conductive paste including one or more conductive metals from among silver (Ag), palladium (Pd), gold (Au), platinum (Pt), nickel (Ni), copper (Cu), tin (Sn), tungsten (W), titanium (Ti), and alloys thereof.

The ceramic body 110 may be formed by alternately laminating a ceramic green sheet on which the first internal electrode 121 is printed and a ceramic green sheet on which the second internal electrode 122 is printed on the dielectric layer third direction (Z direction). As a method of printing the first and second internal electrodes 121 and 122, a screen-printing method, a gravure printing method, or the like, may be used, but the printing method is not limited thereto.

Figure 4:
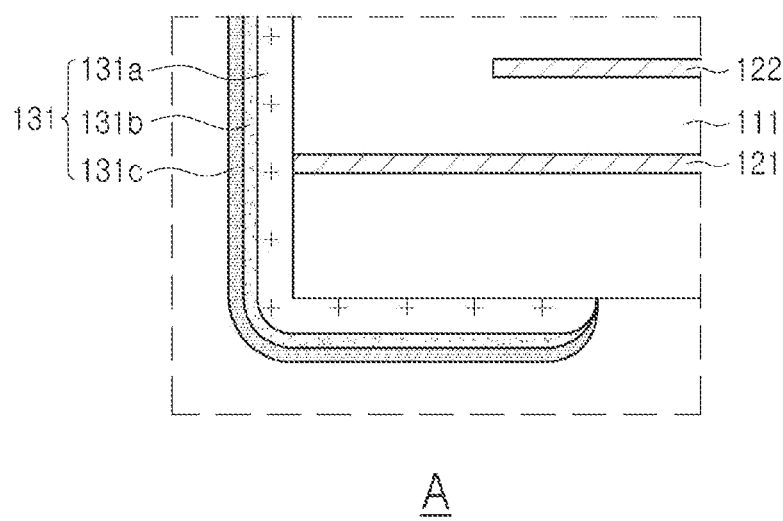
FIG. 4 is an enlarged diagram illustrating region A in FIG. 3.

In the multilayer ceramic electronic component 100 in an example embodiment, the first external electrode 131 and the second external electrode 132 may be disposed on both surfaces of the ceramic body 110 in the first direction (X direction). The first external electrode 131 may be connected to the first internal electrode 121, and the second external electrode 132 may be connected to the second internal electrode 122. The first external electrode 131 and the second external electrode 132 may be disposed on the first surface S1 and the second surface S2 of the ceramic body 110, respectively, and the first external electrode 131 may include a first base electrode layer 131a and a first resin electrode layer 131b, and the second external electrode 132 may include a second base electrode layer 132b and a second resin electrode layer 132b. Note that, although FIG. 4 illustrates a disposition of the first base electrode layer 131a and the first resin electrode layer 131b with respect to the first surface S1 (on the left side of FIG. 3), the second base electrode layer 132b and the second resin electrode layer 132b are arranged to be disposed in the similar manner with respect to the second surface S2 of the ceramic body 110 (on the right side of FIG. 3).

In an example embodiment, the first and second base electrode layers 131a and 132a connected to the first and second internal electrodes 121 and 122 of the multilayer ceramic electronic component 100, respectively, in an example embodiment may be a baked electrode including a first conductive metal. As the first conductive metal included in the first and second base electrode layers 131a and 132a, various metals having excellent contact with internal electrodes may be used. For example, a metal element including one or more elements from a group consisting of copper (Cu), nickel (Ni), tin (Sn), palladium (Pd), platinum (Pt), iron (Fe), gold (Au), silver (Ag), tungsten (W), titanium (Ti), lead (Pb), and alloys thereof. When the first and second base electrode layers 131a and 132a are formed as a baked electrode including a first conductive metal as in the example embodiment, connectivity with the internal electrode may improve, and mechanical strength of the multilayer ceramic electronic component 100 may increase.

A method of forming the first and second base electrodes 131a and 132a is limited to any particular example. For example, a conductive paste including a first conductive metal may be printed or applied to the surface of the ceramic body 110 by a screen-printing method or a gravure printing method, the ceramic body 110 may be dipped in the conductive paste, or dry film obtained by drying the paste may be transferred on the ceramic body 110, or various other methods may be used, but an example embodiment thereof is not limited thereto.

The first and second resin electrode layers 131b and 132b of the multilayer ceramic electronic component 100 in an example embodiment may include a thermosetting shape memory polymer. In an example embodiment, the thermosetting shape memory polymer may include an organic epoxy resin or a cured product of a curing agent.

In an example, the organic epoxy resin may include one or more resins selected from a group consisting of a bisphenol-based epoxy resin, a biphenyl-based epoxy resin, a naphthalene-based epoxy resin, a fluorene-based epoxy resin, a phenol novolak-based epoxy resin, a cresol novolac-based epoxy resin, a xylox-based epoxy resin, trishydroxylphenylmethane-based epoxy resin, a tetraphenylmethane-based epoxy resin, a dicyclopentadiene epoxy resin, and a dicyclopentadiene-modified phenol-type epoxy resin. Examples of the bisphenol-based epoxy resin may include bisphenol A type epoxy resin, bisphenol F type epoxy resin, bisphenol S type epoxy resin, hydrogenated bisphenol A type epoxy resin, bisphenol AF type epoxy resin, or the like, but an example embodiment thereof is not limited thereto.

The organic epoxy resin may have 80 g/eq. to 1,000 g/eq. of an average epoxy equivalent. The average epoxy equivalent may be a value calculated based on the weight ratio and epoxy equivalent of each epoxy resin included in the organic epoxy resin.

In an example embodiment, the organic epoxy resin included in the thermosetting shape memory polymer may have a viscosity within a range of about 800 mPa·s or more and/or about 2,000 mPa·s or less as measured according to ISO 12058-1 at about 25° C. When viscosity is lower than the above range, there may be an issue in formability, such that formation of the electrode may be difficult, and when viscosity exceeds the above range, an exterior defect may occur when an external electrode is formed.

In an example embodiment, a glass transition temperature (Tg) of the thermosetting shape memory polymer of the multilayer ceramic electronic component may be about 50° C. or higher and/or about 200° C. or lower. The glass transition temperature may be a value obtained using a dynamic mechanical analyzer (DMA). When the glass transition temperature of the thermosetting shape memory polymer of the multilayer ceramic electronic component in the example embodiment is lower than the above range, the strength of adhesion to the substrate may be lowered. When the glass transition temperature higher than the above range, it may be difficult to exhibit shape recovery performance under actual use conditions.

In another example embodiment, the thermosetting shape memory polymer of the multilayer ceramic electronic component may have a storage modulus of about 1.3 GPa or more and/or about 8.5 GPa or less at about 25° C. The storage modulus may be a value obtained using a dynamic mechanical analyzer (DMA). When the storage modulus of the thermosetting shape memory polymer of the multilayer ceramic electronic component in the example embodiment satisfies the above range, external impacts may be effectively absorbed, thereby improving mechanical reliability of the multilayer ceramic electronic component.

Examples of the organic epoxy resin may include 3,4-epoxycyclohexylmethyl 3', 4'-epoxycyclohexanecarboxylate (EEC) and derivatives, dicyclopentadienedioxide and derivatives, 3-ethyl-3-oxetanmethanol and derivatives, diglycidyltetrahydrophthalate and derivatives, diglycidyl-hexahydrophthalate and derivatives, 1,2-ethanediglycidylether and derivatives, 1,3-propanediglycidylether and derivatives, 1,4-butanedioldiglycidylether and derivatives, higher 1,n-alkanediglycidylether and derivatives, bis[(3,4-epoxycyclohexyl)methyl]adipate and derivatives, vinylcyclohexyldioxide and derivatives, 1,4-cyclohexanedimethanolbis(3,4-epoxycyclohexanecarboxylate) and derivatives, diglycidyl 4,5-epoxytetrahydrophthalate and derivatives, bis[1-ethyl(3-oxetanyl)methyl]ether and derivatives, pentaerythrityltetraglycidylether and derivatives, bisphenol A diglycidyl ether (DGEBA), hydrogenatedbisphenol A diglycidylether, bisphenol F diglycidylether, hydrogenated bisphenol F diglycidylether, epoxy phenol novolac, hydrogenated epoxy phenol novolac, epoxy cresol novolac, hydrogenated epoxy cresol novolac, 2-(7-oxabicyclospiro(1,3-dioxane-5),3'-(7-oxabicyclo[4.1.0]heptane)), or 1,4-bis((2,3-cypropoxy)-methyl)cyclohexane, or the like, but an example embodiment thereof is not limited thereto.

In an example embodiment, the curing agent included in the thermosetting shape memory polymer may include disulfide bonds. The disulfide bonds may refer to —S—S— bonds, and may include both a dithiol compound having two disulfide bonds and a polythiol compound having three or more disulfide bonds. The disulfide bonds may work as a secondary crosslink between polymer segments in a thermosetting polymer forming a chemical crosslink. Accordingly, the thermosetting shape memory polymer may form a modified shape, and may provide thermoplastic properties to the thermosetting compound.

The type of the curing agent is not limited to any particular example as long as the curing agent includes disulfide bonds. Examples of a compound including disulfide bonds may include 1,4-butanedithiol, 1,5-pentanedithiol, 1,6-hexanedithiol, 1,8-octanedithiol, 1,9-nonandithiol, 1,10-decanedithiol, p-xylene-α, α'-dithiol, 2,4,6-trimercapto-s-triazole, 2,5-dimercapto-1,3,4-thiadiazole, diethyldisulfide, di-sec-butyldisulfide, diphenyldisulfide, p,p'-dithryldisulfide, dihexyldisulfide, dioctyldisulfide, dibenzyldisulfide, dibenzoyldisulfide, dithiobenzoyldisulfide, bis(2,6-difluorophenyl)disulfide, bis(2,6-dimethyl-4-t-butylphenyl)disulfide, tetramethylthiuram disulfide, tetraethylthiuram disulfide, tetrabutylthiuram disulfide, tetrabenzyltiuram disulfide, diaminodiphenyl disulfide, 4,4'-dihydroxydiphenyl disulfide, 2, 2'-dicarboxydiphenyl disulfide, 4, 4'-diaminodiphenyl disulfide, or the like, but an example embodiment thereof is not limited thereto.

In an example embodiment, the first resin electrode layer 131b and the second resin electrode layer 132b of the multilayer ceramic electronic component may include a conductivity imparting agent. The conductivity imparting agent may allow the resin electrode layer including the above-described shape memory polymer to have electrical conductivity, and may include a conductive metal and/or a conductive polymer. The conductive metal may be, for example, one or more elements selected from a group consisting of calcium (Ca), titanium (Ti), molybdenum (Mo), tungsten (W), iron (Fe), cobalt (Co), nickel (Ni), palladium (Pd), platinum (Pt), copper (Cu), silver (Ag), gold (Au), zinc (Zn), aluminum (Al), tin (Sn), lead (Pb), alloys thereof, but an example embodiment thereof is not limited thereto.

Also, examples of the conductive polymer may include, although not limited thereto, PT (poly(thiophene)), PEDOT (poly(ethylenedioxy) thiophene), PPS (poly(p-phenylene sulfide)), PANI (polyanilines), P3HT (poly(3-hexylthiophene-2,5-diyl)), PolyTPD (poly(4-butylphenyldiphenylamine)), PSS (poly(4-butylphenyldiphenylamine)), PVK (poly(9-vinylcarbazole)), PDBT (poly(4,4'-dimethoxy bithophene)), sulfur (S) and/or nitrogen (N)-containing compounds such as polypyrrole or polyaniline, and also include compounds including no hetero atom such as poly(fluorine), polyphenylene, polypyrene, polyazulene, polynaphthalene, PAC (poly(acetylene)), PPV (poly(p-phenylene vinylene), or the like, but an example embodiment thereof is not limited thereto.

In an example, the first and second resin electrode layers 131b and 132b of the multilayer ceramic electronic component in an example embodiment may further include fillers such as carbon nanotubes, graphene, and fullerene. The filler may be included to improve strength and/or shape recovery, and may function as a reinforcing material. When the filler is included, shape recovery ability of the first and second resin electrode layers of the multilayer ceramic electronic component in an example embodiment may improve.

In an example embodiment, the first and second resin electrode layers 131b and 132b of the multilayer ceramic electronic component 100 in an example embodiment may cover the first and second base electrode layers 131a and 132a, respectively. In example embodiment, the configuration in which one layer is disposed to "cover" to another layer may indicate the structure in which an internally disposed layer may not be externally exposed, and the internally disposed layer may be disposed in the externally disposed layer, and when viewed from the outside, only the externally disposed layer may be viewed. As described above, when the first and second resin electrode layers 131b and 132b are disposed to cover the first and second base electrode layers 131a and 132a, respectively, the first and second base electrode layers 131a and 132a may not be externally exposed, and the first and second resin electrode layers 131b and 132b may reduce external impact or penetration of contaminants such as moisture.

The method of forming the first and second resin electrode layers 131b and 132b is not limited to any particular method. For example, the first and second resin electrode layers 131b and 132b may be formed by dipping the ceramic body 110 in a paste including a thermosetting shape memory polymer and a conductivity imparting agent, by printing the paste on the surface of the ceramic body 110 by a screen printing method or a gravure printing method, by applying the paste on the surface of the ceramic body 110 or transferring a dry film obtained by drying the paste onto the ceramic body 110, but an example embodiment thereof is not limited thereto.

In an example embodiment, the multilayer ceramic electronic component 100 in an example embodiment may include a first plating layer 131c disposed on the first resin electrode layer 131b and a second plating layer 132c disposed on the second resin electrode layer 132b. The first and second plating layers 131c and 132c may be formed by sputtering or electroplating, but an example embodiment thereof is not limited thereto. A material for forming the first and second plating layers 131c and 132c is not limited to any particular material, and may include nickel (Ni), copper (Cu), tin (Sn), palladium (Pd), platinum (Pt), gold (Au), silver (Ag), tungsten (W), titanium (Ti), or lead (Pb) or alloys thereof.

According to the aforementioned example embodiment, defects such as lifting or delamination of the external electrodes of the multilayer ceramic electronic component may be prevented even under conditions of high temperature and/or high vibration.

Also, long-term reliability of a multilayer ceramic electronic component may improve.

While the example embodiments have been illustrated and described above, it will be apparent to those skilled in the art that modifications and variations could be made without departing from the scope in the example embodiment as defined by the appended claims.

What is claimed is:

1. A multilayer ceramic electronic component, comprising:
    a ceramic body including a dielectric layer and first and second internal electrodes alternately laminated with the dielectric layer interposed therebetween;
    a first external electrode connected to a first internal electrode of the ceramic body; and
    a second external electrode connected to a second internal electrode,
    wherein the first external electrode includes a first base electrode layer disposed to be in contact with the ceramic body and a first resin electrode layer disposed on the first base electrode layer, wherein the second external electrode includes a second base electrode layer disposed to be in contact with the ceramic body and a second resin electrode layer disposed on the second base electrode layer, wherein the first resin electrode layer and the second resin electrode layer include a thermosetting shape memory polymer, wherein the thermosetting shape memory polymer has a glass transition temperature (Tg) of about 50° C. or more and/or about 200° C. or less, wherein the thermosetting shape memory polymer includes an organic epoxy resin and a cured product of a curing agent, and wherein the curing agent includes disulfide bonds.

2. The multilayer ceramic electronic component of claim 1, wherein the thermosetting shape memory polymer has an elastic modulus of about 1.3 GPa or more and/or about 8.5 GPa or less at about 25° C.

3. The multilayer ceramic electronic component of claim 1, wherein the organic epoxy resin includes one or more resins selected from a group consisting of a bisphenol-based epoxy resin, a biphenyl-based epoxy resin, a naphthalene-based epoxy resin, a fluorene-based epoxy resin, a phenol novolak-based epoxy resin, a cresol novolac-based epoxy resin, a xylox-based epoxy resin, trishydroxylphenylmethane-based epoxy resin, a tetraphenylmethane-based epoxy resin, a dicyclopentadiene epoxy resin, and a dicyclopentadiene-modified phenol-type epoxy resin.

4. The multilayer ceramic electronic component of claim 1, wherein the organic epoxy resin has a viscosity of about 800 mPa·s or more and/or about 2,000 mPa·s or less as measured in accordance with ISO 12058-1 at about 25° C.

5. The multilayer ceramic electronic component of claim 1, wherein the first resin electrode layer and the second resin electrode layer include a conductivity imparting agent.

6. The multilayer ceramic electronic component of claim 1, wherein the first resin electrode layer and the second resin electrode layer further include one or more fillers selected from a group consisting of carbon nanotube, graphene, and fullerene.

7. The multilayer ceramic electronic component of claim 1, wherein the first base electrode layer and the second base electrode layer are baked electrodes including a conductive metal.

8. The multilayer ceramic electronic component of claim 1, wherein the first and second resin electrode layers are disposed to cover the first and second base electrode layers.

9. The multilayer ceramic electronic component of claim 1, further comprising:

first and second plating layers disposed on the first and second resin electrode layers.

10. A multilayer ceramic electronic component, comprising:

a ceramic body including first and second internal electrodes;

a first external electrode connected to a first internal electrode of the ceramic body; and a second external electrode connected to a second internal electrode, wherein the first external electrode includes a first base electrode layer disposed to be in contact with the ceramic body and a first resin electrode layer disposed on the first base electrode layer, wherein the second external electrode includes a second base electrode layer disposed to be in contact with the ceramic body and a second resin electrode layer disposed on the second base electrode layer, wherein the first resin electrode layer and the second resin electrode layer include a polymer having properties including a property that exhibits shape memory effect, wherein the polymer includes a thermosetting shape memory polymer, wherein the thermosetting shape memory polymer has a glass transition temperature (Tg) of about 50° C. or more and/or about 200° C. or less, wherein the thermosetting shape memory polymer includes an organic epoxy resin and a cured product of a curing agent, and wherein the curing agent includes disulfide bonds.

11. The multilayer ceramic electronic component of claim 10, wherein the thermosetting shape memory polymer has an elastic modulus of about 1.3 GPa or more and/or about 8.5 GPa or less at about 25° C.

12. The multilayer ceramic electronic component of claim 10, wherein the organic epoxy resin includes one or more resins selected from a group consisting of a bisphenol-based epoxy resin, a biphenyl-based epoxy resin, a naphthalene-based epoxy resin, a fluorene-based epoxy resin, a phenol novolak-based epoxy resin, a cresol novolac-based epoxy resin, a xylox-based epoxy resin, trishydroxylphenylmethane-based epoxy resin, a tetraphenylmethane-based epoxy resin, a dicyclopentadiene epoxy resin, and a dicyclopentadiene-modified phenol-type epoxy resin.

13. The multilayer ceramic electronic component of claim 10, wherein the organic epoxy resin has a viscosity of about 800 mPa·s or more and/or about 2,000 mPa·s or less as measured in accordance with ISO 12058-1 at about 25° C.

14. The multilayer ceramic electronic component of claim 10, wherein the first resin electrode layer and the second resin electrode layer include a conductivity imparting agent.

15. The multilayer ceramic electronic component of claim 10, wherein the first resin electrode layer and the second resin electrode layer further include one or more fillers selected from a group consisting of carbon nanotube, graphene, and fullerene.

16. The multilayer ceramic electronic component of claim 10, wherein the first base electrode layer and the second base electrode layer are baked electrodes including a conductive metal.

17. The multilayer ceramic electronic component of claim 10, wherein the first and second resin electrode layers are disposed to cover the first and second base electrode layers.

18. The multilayer ceramic electronic component of claim 10, further comprising:

first and second plating layers disposed on the first and second resin electrode layers.

* * * * *